US011142205B2

(12) United States Patent
Hilnbrand et al.

(10) Patent No.: US 11,142,205 B2
(45) Date of Patent: Oct. 12, 2021

(54) SYSTEM AND METHOD TO NOTIFY OPERATOR OF HOST-VEHICLE OF TAKEOVER-EVENT IN ANOTHER-VEHICLE

(71) Applicant: APTIV TECHNOLOGIES LIMITED, St. Michael (BB)

(72) Inventors: Brian R. Hilnbrand, Mountain View, CA (US); Michael H. Laur, Mission Viejo, CA (US); Divya Agarwal, Sunnyvale, CA (US); Nandita Mangal, Palo Alto, CA (US)

(73) Assignee: Aptiv Technologies Limited, St. Michael (BB)

( * ) Notice: Subject to any disclaimer, the term of this patent is extended or adjusted under 35 U.S.C. 154(b) by 722 days.

(21) Appl. No.: 15/963,142

(22) Filed: Apr. 26, 2018

(65) Prior Publication Data

US 2019/0329774 A1 Oct. 31, 2019

Related U.S. Application Data

(60) Provisional application No. 62/662,411, filed on Apr. 25, 2018.

(51) Int. Cl.
*B60W 30/182* (2020.01)
*G05D 1/02* (2020.01)
(Continued)

(52) U.S. Cl.
CPC .......... *B60W 30/182* (2013.01); *B60Q 9/00* (2013.01); *B60W 50/14* (2013.01); *G05D 1/028* (2013.01);
(Continued)

(58) Field of Classification Search
None
See application file for complete search history.

(56) References Cited

U.S. PATENT DOCUMENTS

2015/0006012 A1* 1/2015 Kammel ............... B60W 50/14
701/23
2016/0026180 A1* 1/2016 Tsimhoni ............. B60W 30/00
701/23
(Continued)

FOREIGN PATENT DOCUMENTS

DE 10 2015 112120 A1 1/2016
DE 10 2015 225161 A1 6/2017

OTHER PUBLICATIONS

European Search Report for Application No. 19169759.8, European Patent Office, dated Sep. 6, 2019.

*Primary Examiner* — Todd Melton
*Assistant Examiner* — Jason R Roberson
(74) *Attorney, Agent, or Firm* — Colby Nipper PLLC

(57) ABSTRACT

A control system for an automated vehicle includes a receiver, an alert-device, and a controller-circuit. The receiver is configured to receive a report of a takeover-event broadcast by another-vehicle at a location, said takeover-event characterized by an other-operator of the other-vehicle engaging a manual-mode of operation of the other-vehicle at the location while the other-vehicle was being operated in an automated-mode. The alert-device is operable to notify a host-operator of a host-vehicle. The controller-circuit is in communication with the receiver and the alert-device. The controller-circuit is configured to, in response to a determination that the host-vehicle is approaching the location, operate the alert-device to notify the host-operator of the host-vehicle about the takeover-event by the other-operator of the other-vehicle at the location.

20 Claims, 3 Drawing Sheets

(51) Int. Cl.
*B60W 50/14* (2020.01)
*B60Q 9/00* (2006.01)
*H04L 29/08* (2006.01)

(52) U.S. Cl.
CPC ..... *G05D 1/0287* (2013.01); *B60W 2050/146* (2013.01); *B60W 2556/65* (2020.02); *G05D 2201/0213* (2013.01); *H04L 67/12* (2013.01)

(56) References Cited

U.S. PATENT DOCUMENTS

| | | | |
|---|---|---|---|
| 2016/0194003 A1* | 7/2016 | Torii | B60W 30/12 |
| | | | 701/23 |
| 2017/0168483 A1 | 6/2017 | Knorr et al. | |
| 2018/0047285 A1* | 2/2018 | Johnson | G08G 1/164 |
| 2018/0108254 A1 | 4/2018 | Camacho et al. | |

* cited by examiner

SYSTEM AND METHOD TO NOTIFY OPERATOR OF HOST-VEHICLE OF TAKEOVER-EVENT IN ANOTHER-VEHICLE

TECHNICAL FIELD OF INVENTION

This disclosure generally relates to a control system for a vehicle, and more particularly relates to a system that notifies a host-operator of a host-vehicle about a takeover-event by another-operator of another-vehicle.

BRIEF DESCRIPTION OF DRAWINGS

The present invention will now be described, by way of example and with reference to the accompanying drawings, in which.

DETAILED DESCRIPTION

Figure 1:
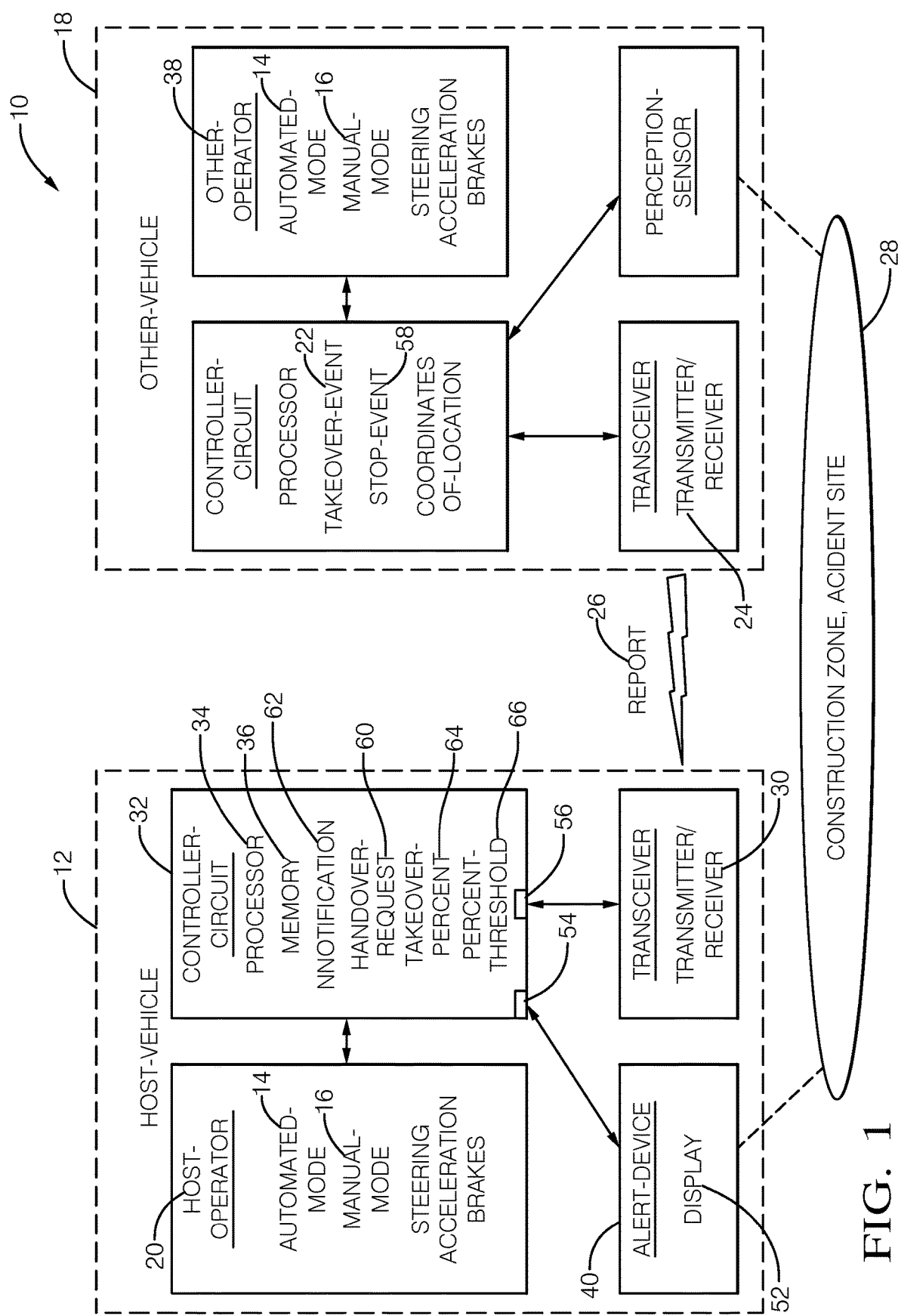
FIG. 1 is diagram of a control system for a vehicle in accordance with one embodiment.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Described herein is a system and a method for notifying a host-operator of a host-vehicle that a location is being approached where an other-operator of an other-vehicle has taken over manual control of the other-vehicle. That the host-vehicle is approaching the location may be determined on various factor such as, but not limited to, being closer than a threshold-distance (e.g. 1 km) to the location, or approaching the last turn-off location available to detour around the location.

FIG. 1 illustrates a non-limiting example of a control system 10, hereafter often referred to as the system 10, for operating an automated vehicle, e.g. a host-vehicle 12 and/or an other-vehicle 18. The host-vehicle 12 and/or the other-vehicle 18 may be characterized as an automated vehicle. As used herein, the term automated vehicle may apply to instances when the host-vehicle 12 and/or the other-vehicle 18 is being operated in an automated-mode 14, i.e. a fully autonomous mode, where a host-operator 20 of the host-vehicle 12 or an other-operator 38 of the other-vehicle 18 may do little more than designate a destination to operate the host-vehicle 12. However, full automation is not a requirement. It is contemplated that the teachings presented herein are useful when the host-vehicle 12 is operated in a manual-mode 16 where the degree or level of automation may be little more than providing an audible or visual warning to the host-operator 20 who is generally in control of the steering, accelerator, and brakes of the host-vehicle 12. For example, the system 10 may merely assist the human-operator as needed to change lanes and/or avoid interference with and/or a collision with, for example, an object such as another-vehicle, a pedestrian, or a road sign. Those in the automated or autonomous vehicle arts will recognize that the automated controls of the host-vehicle 12 and/or the other-vehicle 18 would control vehicle-operation in the automated-mode 14 which may include operation of the steering, the accelerator, brakes, or any combination thereof.

The system 10 includes a receiver 30 (DSRC, Wi-Fi, cellular) configured to receive a report 26 of a takeover-event 22 broadcast by an other-vehicle 18 at a location 28. The receiver 30 may be part of a known type of transceiver such as a cellular-phone network transceiver, a Wi-Fi transceiver, or a dedicated-short-range-communications (DSRC) transceiver, as will be recognized by those in the wireless communications arts.

It follows that the other-vehicle 18 is equipped with a transmitter 24 so the instance of the takeover-event 22 can be broadcast as a warning to any other vehicles (e.g. to the host-vehicle 12) that are in or approaching the area where the takeover-event 22 occurred. The transmitter 24 may be part of a known type of transceiver such as a cellular-phone network transceiver, a Wi-Fi transceiver, or a dedicated-short-range-communications (DSRC) transceiver, as will be recognized by those in the wireless communications arts. The transmitter 24 may be used to transmit the report 26 that may include, but is not limited to, information about the takeover-event 22 such as the location 28 (e.g. GPS coordinates) where the takeover-event 22 occurred and/or data from the perception-sensor (e.g. a video feed) of the other-vehicle 18 that could be useful to the system 10 to determine whether the host-vehicle 12 should avoid the location 28 or should travel through the location 28.

As used herein, the takeover-event 22 is characterized by an other-operator 38 of the other-vehicle 18 engaging the manual-mode 16 of operation of the other-vehicle 18 at the location 28 while the other-vehicle 18 was being operated in the automated-mode 14. That is, the takeover-event 22 is initiated by the other-operator 38 taking some action to change the operation of the other-vehicle 18 to the manual-mode 16 from the automated-mode 14. As such, the takeover-event 22 is not comparable to and should not be confused with a so-called handover-event where the automation that operates a vehicle in the automated mode makes the decision to exit or quit operation in the automated-mode 14, which in some cases may be preceded by the automation making a request (e.g. audible and/or visual and/or tactile and/or vibration) to a human-operator to take control of the vehicle before exiting the automated mode. As suggested above, the automated-mode 14 may be characterized as fully autonomous, i.e. driverless operation, or partially automated, e.g. providing only speed-control. The takeover-event 22 may be a forced takeover where the other-operator 38 forcibly or physically overcome automated speed control by manually operating the brakes, and/or forcibly or physically overcome automated steering by forcing the hand-wheel (i.e. steering wheel) to some position or orientation other than what the automated operation of the steering has selected. Alternatively, the takeover-event 22 may be the result of the other-operator operating a switch or issuing a voice command that is effective to disengage the automated-mode 14.

The system 10 includes an alert-device 40 operable to notify a host-operator 20 of the host-vehicle 12 regarding, but not limited to, the reception of the report 26 of the takeover-event 22 by the other-operator 38. Typically the host-operator 20 would be located within the host-vehicle 12, but it is contemplated that the host-operator 20 may be located at an offboard service center. The alert-device 40 may be, but is not limited to: a display 52 installed in the host-vehicle 12 and/or the display 52 of a smart-phone of the host-operator 20, a speaker operable to emit a voice alert to the host-operator 20, a buzzer or chime configured to be heard by the host-operator, an indicator-light located so as to be observable by the host-operator 20, a vibration-transducer in a seat occupied by the host-operator and/or in a handwheel of the host-vehicle 12, or any combination thereof.

The system 10 includes a controller-circuit 32, preferably installed in the host-vehicle 12, that is in communication with the receiver 30 via an input 56 of the controller-circuit 32, and the alert-device 40 via an output 54 of the controller-circuit 32. The communication may be by way of, but is not limited to, wires, optical-fiber, or wireless communications as will be recognized by those in the art. The controller-circuit 32, hereafter sometimes referred to as the controller 32, may include one or more instances of a processor 34 such as one or more instances of a microprocessor or other control circuitry such as analog and/or digital control circuitry including an application specific integrated circuit (ASIC) for processing data as should be evident to those in the art. While the system 10 described herein is generally described in terms of having a single instance of the controller 32, it is recognized that the functions of the controller 32 may be shared or distributed among several instances of controllers that are each configured for some specific task. Hereafter, any reference to the controller 32 being configured for something is to also be interpreted as suggesting that the processor 34 may also be configured for the same thing. The controller 32 may include memory 36, i.e. non-transitory computer-readable storage-medium, including non-volatile memory, such as electrically erasable programmable read-only memory (EEPROM) for storing one or more routines, thresholds, and captured data. The memory 36 may be part of the processor 34, or part of the controller 32, or separate from the controller 32 such as remote memory stored in the cloud. The one or more routines may be executed by the controller 32 or the processor 34 to perform steps for determining how to operate the host-vehicle 12 based on signals received by the controller 32 from, but not limited to, the receiver 30 as described herein.

The controller-circuit 32 (or the processor 34) is configured to, in response to a determination that the host-vehicle 12 is approaching the location 28 where the takeover-event 22 occurred, operate the alert-device 40 to notify the host-operator 20 of the host-vehicle 12 about the takeover-event 22 by the other-operator 38 of the other-vehicle 18 at the location 28. If the host-vehicle 12 is being operated in an automated-mode, the information that the other-operator 38 has executed the takeover-event 22 may be used by the host-operator 20 to prepare to take control of the host-vehicle 12, i.e. change operation of the host-vehicle 12 to a manual-mode. If the host-vehicle 12 is already being operated in the manual-mode, the information that the other-operator 38 has executed the takeover-event 22 may be used by the host-operator 20 to increase the attention level of the host-operator 20 as the situation at the location 28 may present something unexpected.

Figure 2:
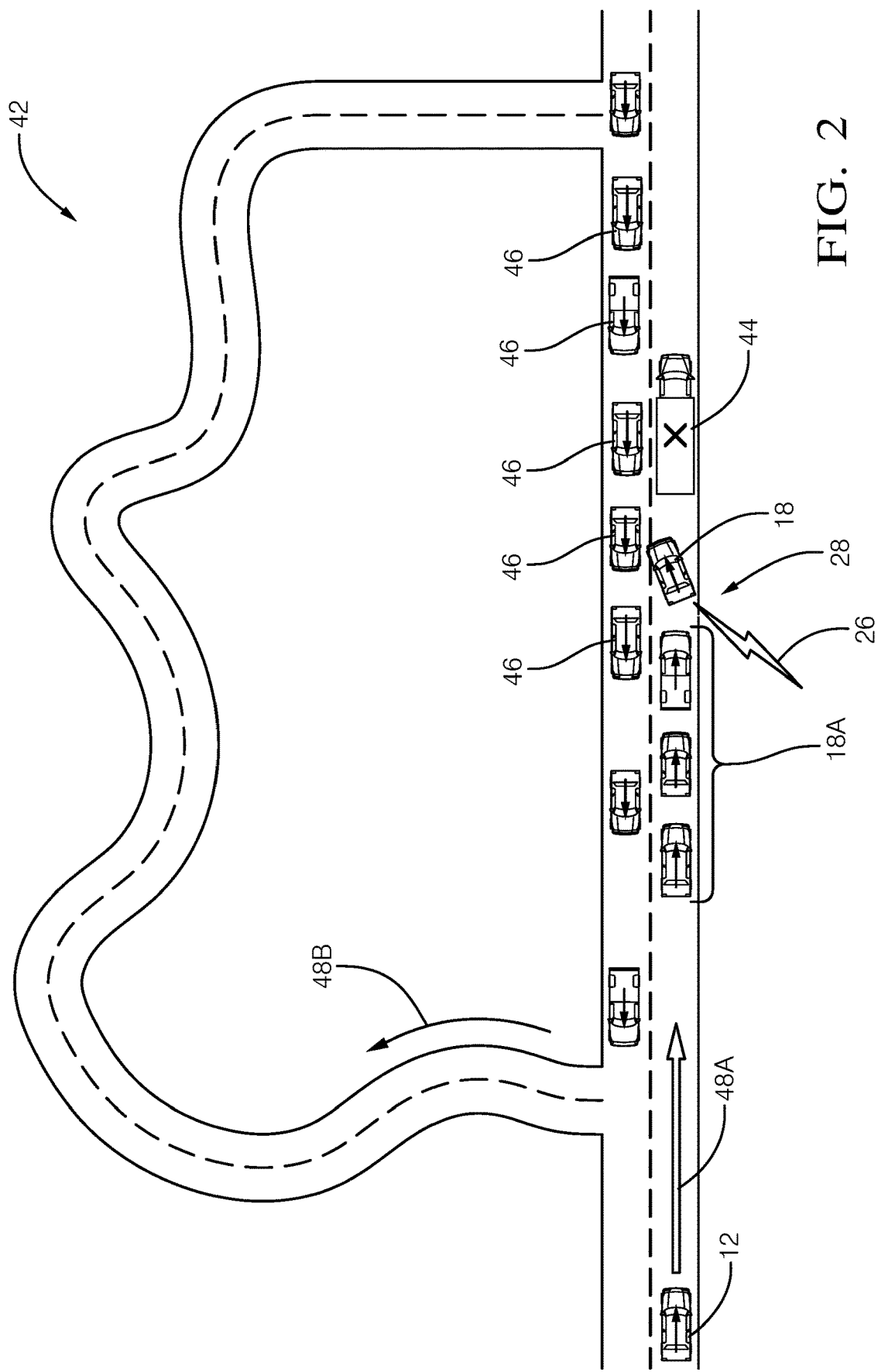
FIG. 2 is scenario encountered by the system of FIG. 1 in accordance with one embodiment.
Figure 3:
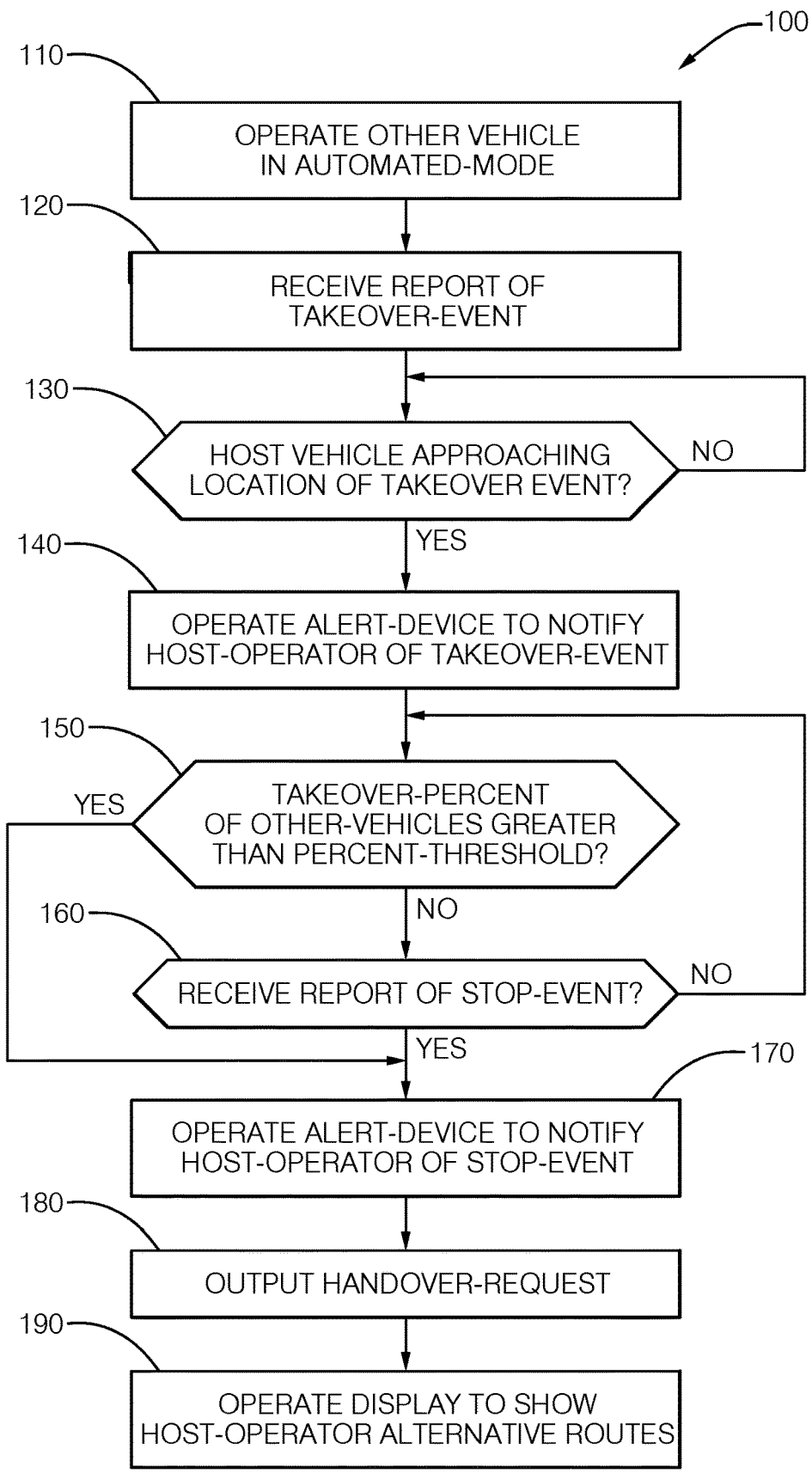
FIG. 3 is method of operating the system of FIG. 1 in accordance with one embodiment.

FIG. 2 illustrates a non-limiting example of a scenario 42 encountered by the host-vehicle 12 equipped with the system 10. In this example, a disabled-vehicle 44 has blocked the travel-path of the other-vehicle 18, and the opposing-traffic 46 is too dense for the other-vehicle 18 to drive around, i.e. pass, the disabled-vehicle 44. The other-operator 38 may have executed the takeover-event 22 as the other-vehicle 18 approached the disabled-vehicle 44, i.e. before the other-vehicle 18 stopped because of the presence of the disabled-vehicle 44 and the opposing-traffic 46. Upon receiving the notification 62 via the alert-device 40, the host-operator 20 may elect to continue along a present-route 48A to the location 28, or follow a detour-route 48B.

The other-vehicle 18 may be configured to broadcast a second instance of the report 26 if/when the other-vehicle 18 stops or substantially slows following the takeover-event 22. That is, a subsequent instance of the report 26 broadcast after the takeover-event 22 may include or report an instance of a stop-event 58 (FIG. 1) or a slowdown-event (not shown). By way of example and not limitation, the slowdown-event may be determined based on a percentage reduction in speed, e.g. the slowdown-event occurs when the speed of the other-vehicle 18 is reduced by 50% after the takeover-event 22. Knowledge of the stop-event 58 or the slowdown-event would be useful to the host-operator 20 to help plan the operation of host-vehicle 12, e.g. decide to follow the present-route 48A or follow the detour-route 48B. Accordingly, the receiver 30 may be configured to receive a report of the stop-event 58 or the slowdown-event broadcast by the other-vehicle 18 at a location 28. As suggested above, the stop-event 58 may be characterized by the other-operator 38 stopping the other-vehicle 18 after the takeover-event 22. It is further contemplated that the controller 32 may operate the alert-device 40 to issue a handover-request 60 to the host-operator 20 when the other-vehicle 18 stops after the takeover-event 22. The handover-request 60 may be characterized as a request to the host-operator 20 requesting that the host-operator 20 change operation of the host-vehicle 12 to the manual-mode from the automated-mode.

That is, the controller-circuit 32 may be configured to operate the host-vehicle 12 in an automated-mode (fully autonomous or partially automated, e.g. only speed-control) and operate the alert-device 40 to output the handover-request to the host-operator 20 in response to the receiver 30 receiving the report 26 of the stop-event 58 or the slow-down-event when the host-vehicle 12 is being operated in the automated-mode 14, where the handover-request 60 is characterized as requesting the host-operator 20 to change operation of the host-vehicle 12 to the manual-mode 16 from the automated-mode 14.

The system 10 may track or compile a history of takeover-events at the location 28 to see if there is some pattern or consistency, and issue a handover-request 60 to the host-operator 20 when a takeover-percent 64 of other-vehicles 18A (FIG. 2), which may optionally include the other-vehicle 18, experiencing takeover-events 22 at the location 28 is greater than a percent-threshold 66, e.g. 50%. Accordingly, in another embodiment of the system 10, the controller-circuit 32 may be configured to operate the host-vehicle 12 in the automated-mode 14 (fully autonomous or partially automated, e.g. only speed-control) and operate the alert-device 40 to output a handover-request to the host-operator in response to a determination that the takeover-percent 64 of the other-vehicles 18A that are proximate the location 30 and are experiencing takeover-events is greater than a percent-threshold 66. As before, the handover-request 60 is characterized as requesting the host-operator 20 to change operation of the host-vehicle 12 to the manual-mode 16 from the automated-mode 14.

The system 10 may operate a navigation display, e.g. the display 52, to show alternative routes, e.g. the detour-route 48B, that avoid the location 28. To this end, the alert-device 40 may include a display 52 operable to show the host-operator 20 a map 42 (FIG. 2) of the location 28. It follows that the controller-circuit 32 may be configured to operate the display 52 to show the host-operator 20 alternative routes 48B that avoid the location.

Step 110, OPERATE OTHER-VEHICLE IN AUTOMATED-MODE, may include operating the other-vehicle 18 in fully autonomous mode or a partially autonomous mode such automated speed control with human operated steering.

Operating the other-vehicle 18 in the automated-mode 14 may also include detecting an instance of a takeover-event 22, the definition of which is provided above, and broadcasting a report 26 of the takeover-event 22 which may include the location 28 where the takeover-event occurred.

Step 120, RECEIVE REPORT OF TAKEOVER-EVENT, may include receiving, from a receiver 30, the report 26 of the takeover-event 22 that was broadcast by the other-vehicle 18 at or from the location 28. The takeover-event 22 is characterized by the other-operator 38 of the other-vehicle 18 engaging the manual-mode 16 of operation of the other-vehicle 18 at the location 28 while the other-vehicle 18 was being operated in the automated-mode 14.

Step 130, HOST-VEHICLE APPROACHING LOCATION OF TAKEOVER-EVENT?, may include determining that the host-vehicle 12 is within some threshold-distance (e.g. 1 km) of the location 28 and/or determining that the host-vehicle 12 is about to pass the last instance of a detour-route 48B that would allow the host-vehicle 12 to avoid or bypass the location 28.

Step 140, OPERATE ALERT-DEVICE TO NOTIFY HOST-OPERATOR OF TAKEOVER-EVENT, may include operating an alert-device 40 such as a chime or display 52 to notify the host-operator 20 of the host-vehicle 12 about the takeover-event 22 by the other-operator 38 of the other-vehicle 18 at the location 28.

Step 150, TAKEOVER-PERCENT OF OTHER-VEHICLES GREATER THAN PERCENT-THRESHOLD, may include determining that a takeover-percent 64 of other-vehicles 18A that are proximate the location 28 and are experiencing takeover-events 22 is greater than a percent-threshold 66, e.g. 50%. The handover-request 60 is characterized as requesting the host-operator 20 to change operation of the host-vehicle 12 to the manual-mode 16 from the automated-mode 14.

Step 160, RECEIVE REPORT OF STOP-EVENT?, may include receiving, from the receiver 30, a report 26 of a stop-event 58 broadcast by the other-vehicle 18 at a location 28. The stop-event 58 is characterized by the other-operator 38 stopping the other-vehicle 18 after the takeover-event 22.

Step 170, OPERATE ALERT-DEVICE TO NOTIFY HOST-OPERATOR OF STOP-EVENT, may include operating the alert-device 40 to notify the host-operator 20 about the stop-event 58 at the location 28.

Step 180, OUTPUT HANDOVER-REQUEST, may include operating the alert-device 40 to output 54 a handover-request 60 to the host-operator 20 in response to the receiver 30 receiving the report 26 of the stop-event 58 when the host-vehicle 12 is being operated in the automated-mode 14. The handover-request 60 is characterized as requesting the host-operator 20 to change operation of the host-vehicle 12 to the manual-mode 16 from the automated-mode 14. Alternatively, step 180 may include operating the alert-device 40 to output 54 a handover-request 60 to the host-operator 20 in response to a determination that a takeover-percent 64 of other-vehicles 18A that are proximate the location 28 and are experiencing takeover-events 22 is greater than a percent-threshold 66. The handover-request 60 is characterized as requesting the host-operator 20 to change operation of the host-vehicle 12 to the manual-mode 16 from the automated-mode 14.

Step 190, OPERATE DISPLAY TO SHOW HOST-OPERATOR ALTERNATIVE ROUTES, may include operating a display 52 of the alert-device 40 to show the host-operator 20 alternative routes 48B that avoid the location 28.

Described herein is a first device 32 that includes one or more processors 34, memory 36, and one or more programs 110-190 stored in the memory 36, the one or more programs including instructions for performing all or part of the method 100. Also described herein is a non-transitory computer-readable storage-medium 36 comprising one or more programs 110-190 for execution by one or more processors 34 of a first device 32. The one or more programs include instructions which, when executed by the one or more processors 34, cause the first device 32 to perform all or part of the method 100.

Accordingly, a control system (the system 10), a controller 32 for the system 10, and a method 100 of operating the system 10 are provided. The host-operator 20 of a host-vehicle 12 is notified that a location 28 is being approached where an other-operator 38 of an other-vehicle 18 has taken over manual control of the other-vehicle 18, i.e. the other-operator 38 as performed or executed a takeover-event 22.

While this invention has been described in terms of the preferred embodiments thereof, it is not intended to be so limited, but rather only to the extent set forth in the claims that follow.

We claim:

1. A control system for a host vehicle, said control system comprising:
   a receiver configured to receive, directly from another vehicle, a report of a takeover event broadcast by the other vehicle from a location, said takeover event characterized by another operator of the other vehicle engaging a manual mode of operation of the other vehicle while the other vehicle was being operated at the location in an automated mode;
   an alert device operable to notify a host operator of the host vehicle; and
   a controller circuit in communication with the receiver and the alert device, said controller circuit configured to:
      operate the host vehicle in the automated mode;
      in response to a determination that the host vehicle is approaching the location, operate the alert device to notify the host operator of the host vehicle about the takeover event by the other operator of the other vehicle at the location; and
      in response to a determination that a percentage of other vehicles that are proximate the location and are experiencing takeover events is greater than a percent threshold, operate the alert device to output a handover request to the host operator, the handover request being characterized as requesting the host operator to change operation of the host vehicle to the manual mode from the automated mode.

2. The control system in accordance with claim 1, wherein:
   the receiver is further configured to receive a report of a stop event broadcast by the other vehicle at the location, said stop event characterized by the other operator stopping the other vehicle after the takeover event; and
   the controller circuit is further configured to operate the alert device to notify the host operator about the stop event at the location.

3. The control system in accordance with claim 2, wherein the controller circuit is further configured to:
   operate the host vehicle in the automated mode; and
   operate the alert device to output a handover request to the host operator in response to the receiver receiving the report of the stop event when the host vehicle is being operated in the automated mode, said handover request characterized as requesting the host operator to change operation of the host vehicle to the manual mode from the automated mode.

4. The control system in accordance with claim 1, wherein the alert device includes a display operable to show the host operator a map of the location, and the controller circuit is further configured to operate the display to show the host operator alternative routes that avoid the location.

5. A controller circuit for an automated vehicle, said controller circuit comprising:
   an input configured to receive, from a receiver and directly from another vehicle, a report of a takeover event broadcast by the other vehicle from a location, said takeover event characterized by another operator of the other vehicle engaging a manual mode of operation of the other vehicle while the other vehicle was being operated at the location in an automated mode;
   an output configured to operate an alert device operable to notify a host operator of the automated vehicle; and
   a processor in communication with the receiver and the alert device, said processor configured to:
      operate the automated vehicle in the automated mode;
      in response to a determination that the automated vehicle is approaching the location, operate the alert device to notify the host operator of the automated vehicle about the takeover event by the other operator of the other vehicle at the location; and
      in response to a determination that a percentage of other vehicles that are proximate the location and are experiencing takeover events is greater than a percent threshold, operate the alert device to output a handover request to the host operator, the handover request being characterized as requesting the host operator to change operation of the automated vehicle to the manual mode from the automated mode.

6. The controller circuit in accordance with claim 5, wherein:
   the receiver is further configured to receive a report of a stop event broadcast by the other vehicle at the location, said stop event characterized by the other operator stopping the other vehicle after the takeover event; and
   the processor is further configured to operate the alert device to notify the host operator about the stop event at the location.

7. The controller circuit in accordance with claim 6, wherein the processor is further configured to:
   operate the automated vehicle in the automated mode; and
   operate the alert device to output a handover request to the host operator in response to the receiver receiving the report of the stop event when the automated vehicle is being operated in the automated mode, said handover request characterized as requesting the host operator to change operation of the automated vehicle to the manual mode from the automated mode.

8. The controller circuit in accordance with claim 5, wherein the alert device includes a display operable to show the host operator a map of the location, and the processor is further configured to operate the display to show the host operator alternative routes that avoid the location.

9. A method of operating a host vehicle, said method comprising:
   receiving, from a receiver and directly from another vehicle, a report of a takeover event broadcast by the other vehicle from a location, said takeover event characterized by another operator of the other vehicle engaging a manual mode of operation of the other vehicle while the other vehicle was being operated at the location in an automated mode;
   operating the host vehicle in the automated mode; determining that the host vehicle is approaching the location;
   operating an alert device to notify a host operator of a host vehicle about the takeover event by the other operator of the other vehicle at the location; and
   in response to a determination that a percentage of other vehicles that are proximate the location and are experiencing takeover events is greater than a percent threshold, operating the alert device to output a handover request to the host operator, the handover request being characterized as requesting the host operator to change operation of the host vehicle to the manual mode from the automated mode.

10. The method in accordance with claim 9, wherein the method further includes:
   receiving, from the receiver, a report of a stop event broadcast by the other vehicle at the location, said stop event characterized by the other operator stopping the other vehicle after the takeover event; and
   operating the alert device to notify the host operator about the stop event at the location.

11. The method in accordance with claim 10, wherein the method further includes:
   operating the host vehicle in the automated mode; and
   operating the alert device to output a handover request to the host operator in response to the receiver receiving the report of the stop event when the host vehicle is being operated in the automated mode, said handover request characterized as requesting the host operator to change operation of the host vehicle to the manual mode from the automated mode.

12. The method in accordance with claim 9, wherein the method further includes:
   operating a display of the alert device to show the host operator alternative routes that avoid the location.

13. The control system in accordance with claim 1, wherein the report of the takeover event broadcast by the other vehicle includes data from a perception sensor of the other vehicle.

14. The control system in accordance with claim 1, wherein:
   the receiver is further configured to receive a report of a slowdown event broadcast by the other vehicle at the location, said slowdown event characterized by the other operator reducing a speed of the other vehicle by a percentage threshold; and
   the controller circuit is further configured to operate the alert device to notify the host operator about the slowdown event at the location.

15. The control system in accordance with claim 14, wherein the controller circuit is further configured to:
   operate the host vehicle in the automated mode; and
   operate the alert device to output a handover request to the host operator in response to the receiver receiving the report of the slowdown event when the host vehicle is being operated in the automated mode, said handover request characterized as requesting the host operator to change operation of the host vehicle to the manual mode from the automated mode.

16. The controller circuit in accordance with claim 5, wherein the report of the takeover event broadcast by the other vehicle includes data from a perception sensor of the other vehicle.

17. The controller circuit in accordance with claim 5, wherein:
   the receiver is further configured to receive a report of a slowdown event broadcast by the other vehicle at the location, said slowdown event characterized by the other operator reducing a speed of the other vehicle by a percentage threshold; and
   the processor is further configured to operate the alert device to notify the host operator about the slowdown event at the location.

18. The controller circuit in accordance with claim 17, wherein the processor is further configured to:
   operate the automated vehicle in the automated mode; and
   operate the alert device to output a handover request to the host operator in response to the receiver receiving the report of the slowdown event when the automated vehicle is being operated in the automated mode, said handover request characterized as requesting the host operator to change operation of the automated vehicle to the manual mode from the automated mode.

19. The method in accordance with claim 9, wherein the report of the takeover event broadcast by the other vehicle includes data from a perception sensor of the other vehicle.

20. The method in accordance with claim 9, wherein the method further includes:
   receiver, from the receiver, a report of a slowdown event broadcast by the other vehicle at the location, said slowdown event characterized by the other operator reducing a speed of the other vehicle by a percentage threshold; and
   operating the alert device to notify the host operator about the slowdown event at the location.

* * * * *